United States Patent
Shin et al.

(10) Patent No.: US 7,773,751 B2
(45) Date of Patent: Aug. 10, 2010

(54) APPARATUS AND METHOD FOR CONTROLLING THE COPY AND PLAY OF A DIGITAL AUDIO CONTENTS

(75) Inventors: Dong-Hwan Shin, Seoul (KR); Jong-Weon Kim, Seoul (KR); Seung-Won Shin, Seoul (KR); Han-Ho Lee, Seoul (KR)

(73) Assignee: Markany Inc., Seoul (KR)

( * ) Notice: Subject to any disclaimer, the term of this patent is extended or adjusted under 35 U.S.C. 154(b) by 1180 days.

(21) Appl. No.: 10/240,581

(22) PCT Filed: Feb. 19, 2002

(86) PCT No.: PCT/KR02/00250

§ 371 (c)(1),
(2), (4) Date: Feb. 10, 2003

(87) PCT Pub. No.: WO02/067257

PCT Pub. Date: Aug. 29, 2002

(65) Prior Publication Data

US 2003/0161470 A1    Aug. 28, 2003

(30) Foreign Application Priority Data

Feb. 19, 2001    (KR) .................................. 2001/8255

(51) Int. Cl.
*H04N 7/167* (2006.01)
*H04L 9/00* (2006.01)
(52) U.S. Cl. ......................................... 380/239; 726/31
(58) Field of Classification Search ................. 380/220, 380/238, 239; 726/31
See application file for complete search history.

(56) References Cited

U.S. PATENT DOCUMENTS

| 5,535,128 A | * | 7/1996 | Laube et al. ................. 700/119 |
| 5,963,888 A | * | 10/1999 | Uhlmann et al. ............ 702/109 |
| 6,097,508 A | * | 8/2000 | Hattori ........................ 358/475 |
| 6,101,624 A | * | 8/2000 | Cheng et al. ................. 714/736 |

(Continued)

FOREIGN PATENT DOCUMENTS

JP    11-283340 A    10/1999

OTHER PUBLICATIONS (Machine Translation of Detailed Description, pp. 1-12). Tonaka, Y. and Ueno, S. Audio Disk and Encoding Device, Decoding Device for Audio Data and Copy Managing Method. JP 11-283340 A.*

(Continued)

*Primary Examiner*—Gilberto Barron, Jr.
*Assistant Examiner*—Virginia Ho
(74) *Attorney, Agent, or Firm*—Blakely, Sokoloff, Taylor & Zafman LLP (57) ABSTRACT

The object of the present invention is providing the apparatus and method for controlling playing and copying the digital audio contents by way of embedding the control code into and extracting the control code from the digital audio contents. To achieve the object of the invention, the present invention includes control code embedding apparatus which includes timing deciding part for distributing control code, control code embedding part and digital audio signal summing part, and control code extracting apparatus which includes distribution information collecting part, control code discerning part, and decoding/instruction generating part.

10 Claims, 5 Drawing Sheets

U.S. PATENT DOCUMENTS

| | | | |
|---|---|---|---|
| 6,167,136 A | 12/2000 | Chou | |
| 6,282,654 B1* | 8/2001 | Ikeda et al. | 726/31 |
| 6,330,672 B1* | 12/2001 | Shur | 713/176 |
| 6,430,671 B1* | 8/2002 | Smith | 711/220 |
| 6,819,765 B1* | 11/2004 | Kori | 380/203 |
| 7,076,063 B2* | 7/2006 | Kuroiwa | 380/201 |
| 7,110,544 B2* | 9/2006 | Gotoh et al. | 380/203 |
| 7,117,504 B2* | 10/2006 | Smith et al. | 719/328 |
| 7,124,441 B1* | 10/2006 | Gaston | 726/26 |
| 2002/0016916 A1* | 2/2002 | Natarajan | 713/179 |
| 2002/0106105 A1* | 8/2002 | Pelly et al. | 382/100 |
| 2003/0021439 A1* | 1/2003 | Lubin et al. | 382/100 |
| 2003/0061500 A1* | 3/2003 | Mimura et al. | 713/193 |
| 2003/0231785 A1* | 12/2003 | Rhoads et al. | 382/100 |
| 2004/0022444 A1* | 2/2004 | Rhoads | 382/232 |
| 2004/0057581 A1* | 3/2004 | Rhoads | 380/59 |
| 2004/0264735 A1* | 12/2004 | Rhoads | 382/100 |
| 2005/0135656 A1* | 6/2005 | Alattar et al. | 382/100 |

OTHER PUBLICATIONS

International Search Report for PCT Counterpart Application No. PCT/KR02/00250, 2 pgs (May 8, 2002).

* cited by examiner

| No. | CONTROL CODE | FILTER | INFORMATION EMBEDDING REGION | RATIO OF RIPPLE |
|---|---|---|---|---|
| 1 | 00 | filter(0) | signal(0) | 0.05 |
| 2 | 01 | filter(1) | signal(1) | 0.05 |
| 3 | 10 | filter(2) | signal(2) | 0.05 |
| 4 | 11 | filter(3) | signal(3) | 0.05 |

FIG.10

APPARATUS AND METHOD FOR CONTROLLING THE COPY AND PLAY OF A DIGITAL AUDIO CONTENTS

CROSS-REFERENCE TO OTHER APPLICATIONS

This Application is a National Phase of International Application No. PCT/KR02/00250, filed on Feb. 19, 2002, which claims priority from Korean Patent Application No. 2001/8255, filed on Feb. 19, 2001.

1. Technical Field

The present invention relates to an apparatus and method capable of controlling playing and copying copyrighted digital audio contents through embedding ad extracting a control code into and from the copyrighted digital audio contents.

2. Background Art

All copyrighted multimedia contents can be stored and distributed in a digital format so that duplicates identical to an original can be easily produced without any approval of a copyright owner. A huge multimedia market such as the internet has been formed, but the function of which does not become rapidly activated since copyrighted digital contents are easily duplicated and likely to be illegally distributed through the internet network at a high speed. These problems results in losing the interest for manufacturers to produce copyrighted multimedia contents and in reducing the market therefor. In order to truly open the market of the digital era, it can be prevented, with the development of core technologies, for copyrighted contents to be illegally copied and distributed.

There has been the watermarking technology for embedding information in copyrighted digital audio contents, as a method for preventing various kinds of copyrighted audio contents from illegal duplicates and distributions through digital storage media.

Such watermarking technology will not allow embedded information to be removed unless the audio quality of a copyrighted digital audio content is abnormally distorted, has characteristics in that well-trained audio experts can not distinguish information-embedded audio contents from original contents, and allows only copyright owners to distinguish pirate and original contents by embedding into copyrighted digital contents information to be selected only by the copyright owners and by extracting the copyright information embedded in the copyrighted contents in circumstances used and distributed without the permits of the copyright owners, so that it is spotlighted as a copyright protection technology for various kinds of copyrighted digital contents such as images, videos, and audios.

However, the aforementioned watermarking technology is insufficient a lot for basically protecting copyrights since it is a technology based on the after-arising investigation concept in the circumstances used and distributed without permits rather than based on the before-arising prevention effect.

Accordingly, since a technology is much more effective that can basically control distributions from the time when copyrighted digital contents are distributed a method is used that basically prevents copyrighted contents from illegal duplicates and distributions by embedding a few bits-long information in the copyrighted contents to have very sturdy characteristics and joining the technology to hardware.

The above method must satisfy the conditions as follows.

Firstly, a few bits-long information embedded in copyrighted contents must not be removed by copyright infringers.

Secondly, audio quality variations occurring from copyrighted contents in which information is embedded must not be recognized by audio experts.

Thirdly, the amount of calculations and resources required for driving must be small to the extent that the implementation is possible in portable devices such as MP3 players and PDAs.

SUMMARY OF THE INVENTION

The present invention indicates whether coping and playing are possible by, in real time, embedding into and extracting from copyrighted digital audio contents a series of bit information controlling the copying and playing of the copyrighted digital audio contents in order to satisfy the above requisite conditions. It is an object of the present invention to provide an apparatus and method for controlling copying and playing copyrighted digital audio contents by generating a signal preventing the duplicates and distributions of the copyrighted digital audio contents if code information incapable of copying and playing is detected.

That is, control code information embedded into copyrighted contents used in the apparatus and method of the present invention is robust against general signal processing attacks, so that the control code will not be removed with the general signal processing attacks such as add echo, bandpass filtering, equalization, add noise, time scaling, and pitch shift. In addition, the control code will not be removed after converted into MP3, AAC, WMA, and the like which are audio-compression formats.

Further, in the apparatus and method of the present invention, not only is the technology robust which embeds the control code into copyrighted digital audio contents by using a particular frequency manipulation method but no audio quality variation nearly occurs before and after the control code has been embedded, so that audio quality differences between original music and control code-embedded music can not be distinguished by experts.

In the meantime, in the digital audio market in recent, increased day by day is the use of portable devices employing audio compression technology such as MP3, AAC, WMA, and the like besides CD, so that, in the market, the regulations on illegal use and distribution of copyrighted contents will work as the most important factor from now on. The apparatus and method of the present invention enables a series of bits controlling the copying and playing of copyrighted contents to be implemented in real time in personal computers as well as in portable devices mounting a CPU such as TI, ARM, and the like, reflecting the trends of the market.

In order to achieve the above object, an apparatus for controlling copying and playing of copyrighted digital audio contents according to the present invention comprises a control code embedding apparatus having a control code dispersion timing determination part for determining timings dispersedly embedding control code into copyrighted digital audio contents, a control code embedding part for designing filter corresponding to the control code and embedding the control code into the copyrighted digital audio contents at the embedment timing determined in the control code dispersion timing determination part through filtering of the designed filter, and a digital audio signal summation part for summing control code-embedded digital audio signals and control code-free digital audio signals into one audio file;

and a control code extracting apparatus having a dispersion information collection part for collecting control code information dispersedly embedded, a control code selection part for selecting only the control code from the information collected in the dispersion information collection part, and a decode/command signal generation part for decoding commands of the control code selected from the control code selection part and for generating command signals.

Further, in order to achieve the above object, a method for controlling copying and playing of copyrighted digital audio contents according to the present invention comprises a control code embedding process having steps of determining timings dispersedly embedding control code into copyrighted digital audio contents, designing filter corresponding to the control code and embedding the control code into the copyrighted digital audio contents at the determined embedment timing through filtering of the designed filter, and summing control code-embedded digital audio signals and control code-free digital audio signals into one audio file; and a control code extraction process having steps of collecting control code information dispersedly embedded, selecting only the control code from the collected information, and decoding commands of the selected control code and generating command signals.

EMBODIMENT

Hereinafter, an apparatus and method for controlling the copying and playing of copyrighted digital audio contents according to an embodiment of the present invention will be described in detail with reference to accompanying drawings.

Figure 1:
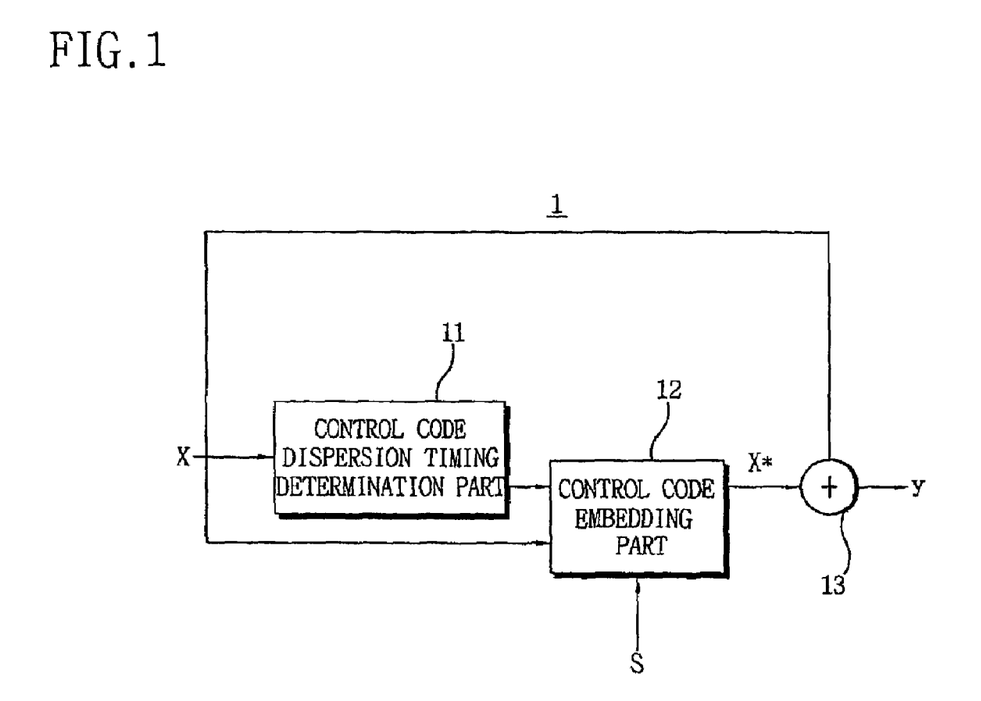
FIG. 1 is a block diagram for illustrating an entire structure of a control code embedding apparatus for embedding code controlling the copying and playing by using a watermark in copyrighted digital audio contents according to an embodiment of the present invention.
Figure 2:
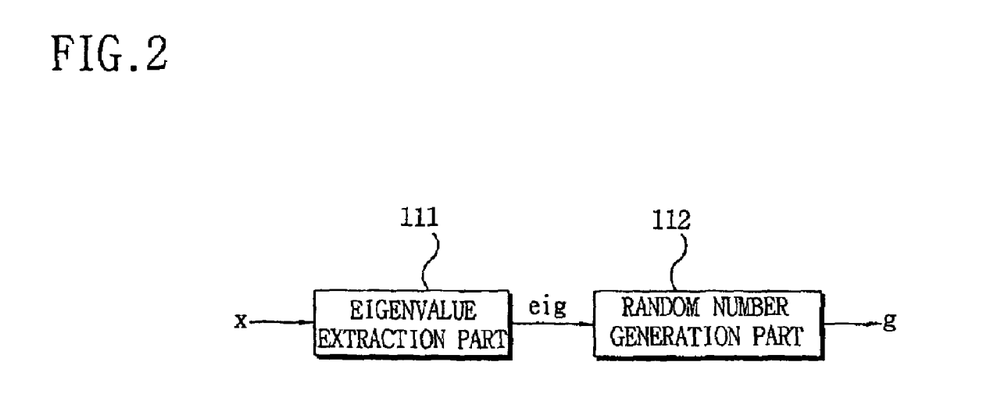
FIG. 2 is a block diagram for illustrating in detail a control code dispersion timing determination part of FIG. 1 which determines the timing for dispersedly embedding control code in copyrighted digital audio contents.
Figure 3:
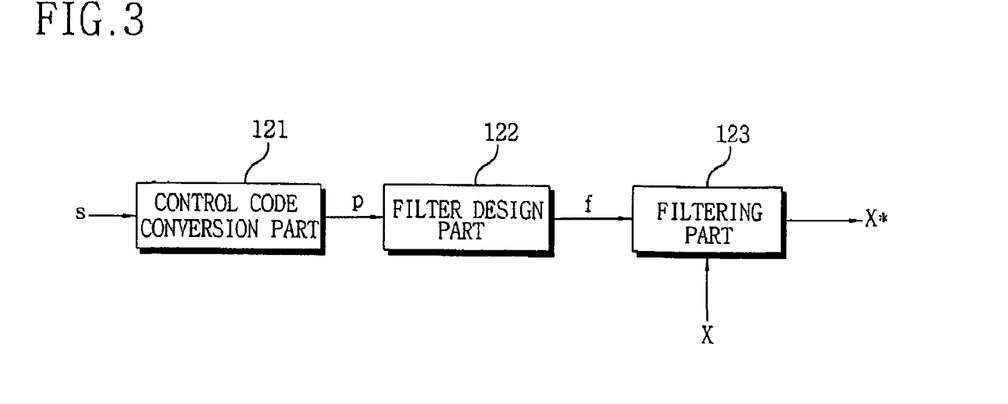
FIG. 3 is a block diagram for illustrating in detail a control code embedding part of FIG. 1 for embedding control code in copyrighted digital audio contents.
Figure 4:
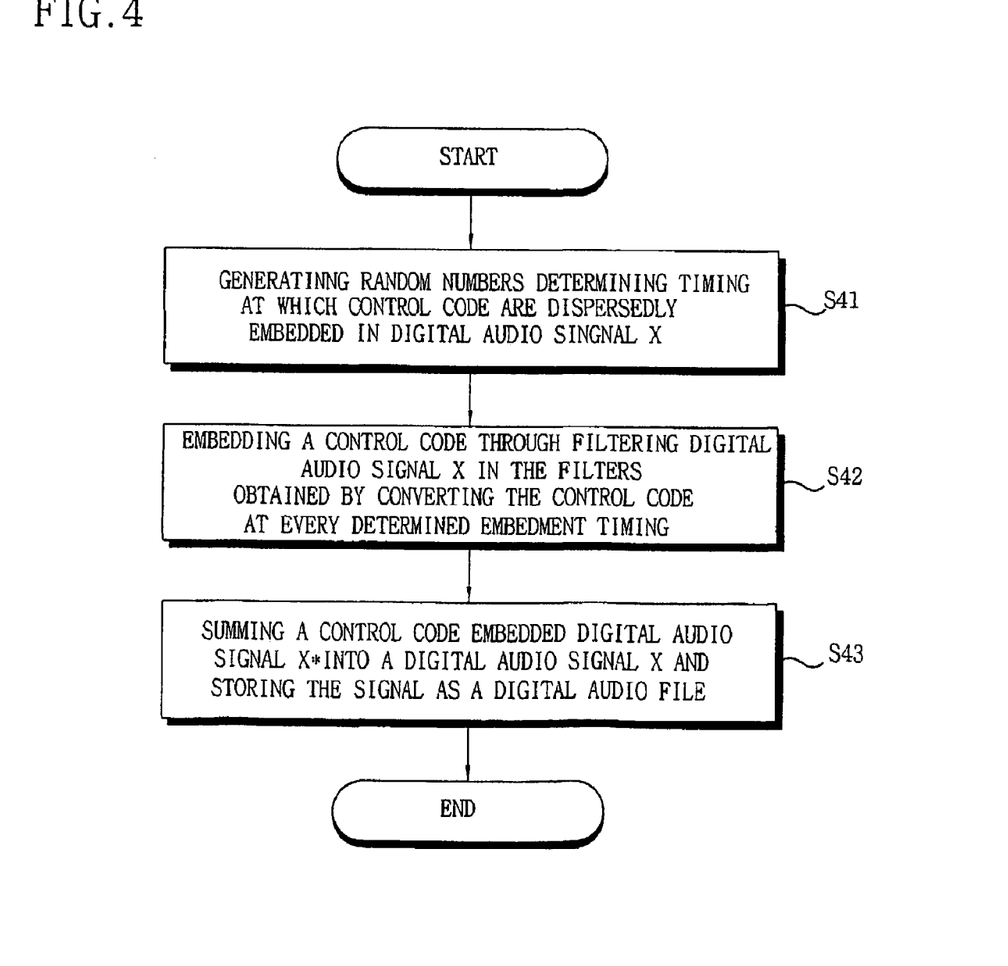
FIG. 4 is a flow chart for illustrating an entire operation process of the control code embedding apparatus of FIG. 1.

First, embodiment of code controlling the copying and playing will be described with reference to FIG. 1 to FIG. 4. FIG. 1 is a block diagram for illustrating an entire structure of a control code embedding apparatus which creates one digital audio file by embedding into copyrighted digital audio contents code controlling the copying and playing according to an embodiment of the present invention, FIG. 2 is a block diagram for illustrating in detail a control code dispersion timing determination part of FIG. 1 which determines the timing for dispersedly embedding control code in copyrighted digital audio contents, FIG. 3 is a block diagram for illustrating in detail a control code embedding part of FIG. 1 for embedding control code in copyrighted digital audio contents, and FIG. 4 is a flow chart for illustrating an entire operation process of the control code embedding apparatus of FIG. 1.

A control code embedding apparatus 1 includes a control code dispersion timing determination part 11 having an eigenvalue extraction part 111 and random number generation part 112; a control code embedding part 12 having a control code conversion part 121, a filter design part 122, and a filtering part 123; and a digital audio signal summation part 13 for summing a control code-embedded digital audio signal and a control code-free digital audio signal to create one audio file.

In the control code embedding apparatus 1, an x denotes a digital audio signal, using a certain length of an audio signal. In order to embed information controlling the copying and the playing over an entire copyrighted digital audio content, embedding intervals are randomly determined.

The control code dispersion timing determination part 11 generates random numbers by using as an initial solution of the random number generation part 112 an eigenvalue obtained from the eigenvalue extraction part 111 so as to determine the timing embedding control code into an inputted audio signal(S41).

In case of embedding the control code more robustly, in the above step S41, a ratio is adjusted to embed control code into the copyrighted digital audio contents from start to end thereof, for example, in case of embedding the control code into a copyrighted content with 50% possibility, the random number generation part 112 is set to generate a 0 or a 1 every time, and, control code are embedded if a generated random number is the 0, and control code-free signals are stored as they are if the generated random number is the 1. The reason embedding control code through such a random number generation process is to prevent control code-embedded positions from being easily found.

In addition, the effect on audio quality due to the embedment of control code must be minimized. The experiments show that the embedment of control code in a range from 50% to 60% has brought the most optimized result in control code robustness and audio quality.

The control code embedding part 12 converts control code into filter design information that can be embedded in copyrighted contents through the control code conversion part 121. The filter design part 122 designs a proper filter by using the filter design information, filter the digital audio signal x inputted through the filtering part 123, and embeds control code at every control code embedment timing determined in the control code dispersion timing determination part 11(S42).

In more detail, the structure and operations of the control code embedding part 12 will be described.

First, the control code conversion part 121 receives an input of a control code s. The control code means a series of commands, for example, it can be set that control code of a 00 and a 11 mean "copy freely" and "no more copy" respectively. The control code conversion part 121 inputted the control code selects filter in a one-to-one correspondence to the respective control code and outputs a signal p indicating a selected filter to the filter design part 122. At this time, a method for matching frequency filter characteristics according to the control code, for example, matching filter characteristics with control code of FIG. 9 listed in a table may be varied according to the kinds and characteristics of copyrighted contents.

The filter design part 122 receiving the signal p indicating a selected filter from the control code conversion part 121 designs a filter based on received information. Even though either of the finite impulse response(FIR) or the infinite impulse response(IIR) filter can be used, the embodiment of present invention is designed with the IIR filter in consideration of a calculation speed.

However, using the IIR filter cause a problem distorting audio quality since an audio phase signal has a non-linearity property. Accordingly, the use of the IIR filter requires a phase non-variation filter designed to prevent the occurrence of phase variations.

In the meantime, an information embedment filter randomly adjusts signal components, generally affecting signals outside frequency bandwidths to be attenuated in a filtering process. An audio signal has characteristics that its slight variation results in a tone variation, so it is required to minimize the unnecessary variations of signals other than a signal to be filtered, and the unnecessary variations of signals are adjusted according to a variation width set in a rippling effect. Accordingly, in order to minimize the unnecessary variations of signals, it is desirable to set the variation width to a small value, so, in the present invention, a filter is designed for the variation width to be less than 0.05 dB at least in order to minimize such a rippling effect. Experimental results show that audio quality is not affected with the design of a filter more than $4^{th}$ order in case of 44.1 kHz, 16-bit CD music.

By filtering an audio signal in the filtering part 123 in use of filter coefficients obtained by the filter design part 122, that is, by removing or attenuating particular bandwidth frequency signals of frequency signals of an audio signal, control code are embedded in an audio signal. Accordingly, by filtering, part of signals in particular frequency regions has low magnitudes than those of ambient signals.

An extraction process to be described later can determine at which regions frequency components are attenuated, with which filter filtering is done, and, again, what control code is embedded from the kinds of filter, to thereby extract control code.

In a filter design and filtering process controls not to embed control code in a range of 3 KHz since human ears are very sensitive to audio signals in the range as well as important signals are included a lot in the audio signal in the range. If few kinds of control information exist, it is desirable to embed information based on is a psycho-acoustic model.

There occur two kinds of digital audio signals from the above process. The digital audio signal summation part 13 adds a control code-embedded digital audio signal x* and a control code-free digital audio signal x into one signal and stores the signal as an audio file again(S43).

Next, extracting embedded control code will be described with reference to FIG. 5 to FIG. 8.

Figure 5:
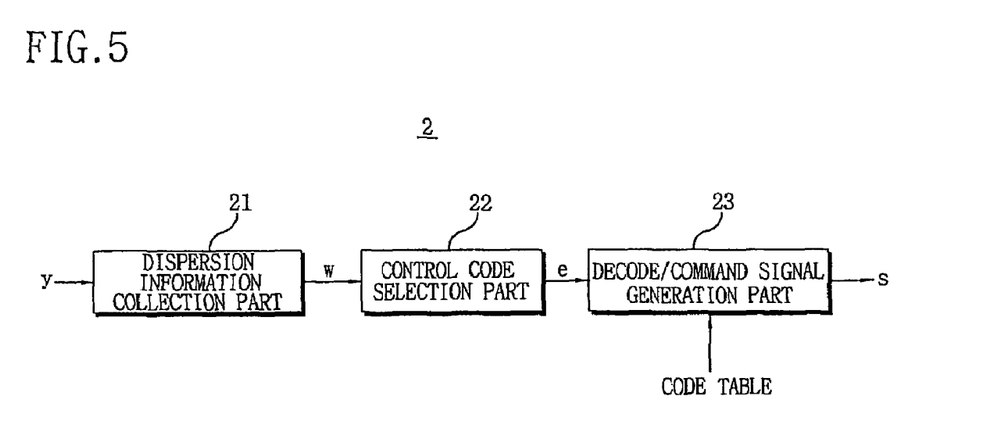
FIG. 5 is a block diagram for illustrating an entire structure of a control code extraction apparatus for extracting code controlling the copying and playing which are embedded in copyrighted digital audio contents according to an embodiment of the present invention.
Figure 6:
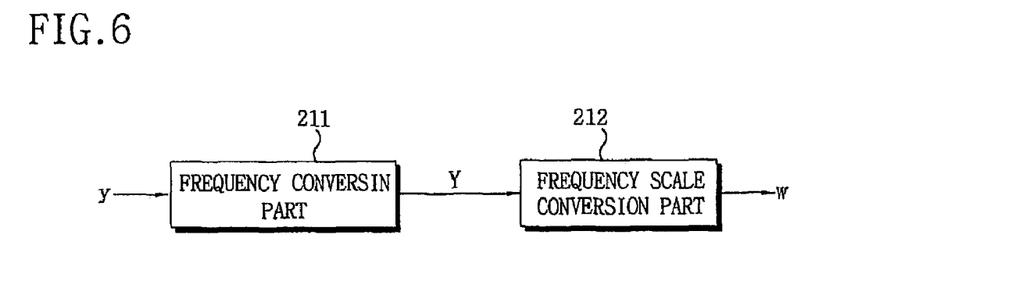
FIG. 6 is a block diagram for illustrating in detail a dispersion information collection part of FIG. 5 for collecting control code information dispersedly embedded.
Figure 7:
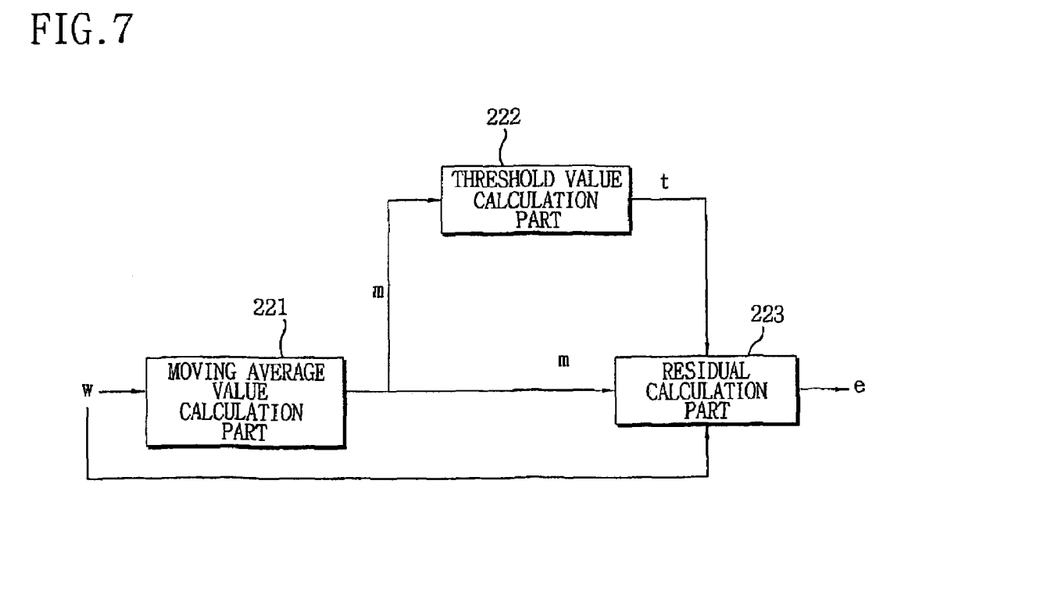
FIG. 7 is a block diagram for illustrating in detail a control code selection part of FIG. 5 for selecting only control code from information collected from the dispersion information collection part.
Figure 8:
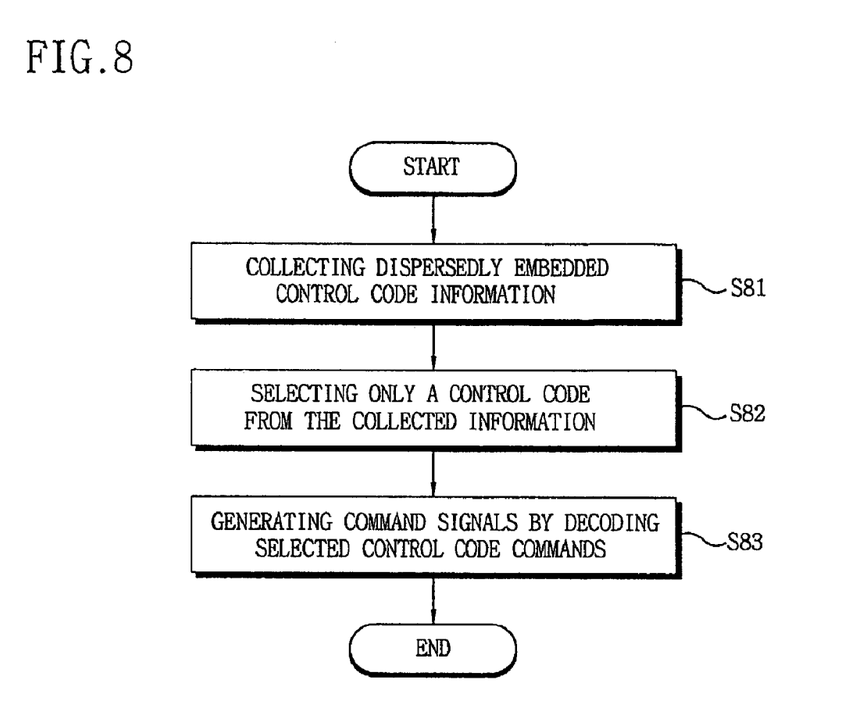
FIG. 8 is a flow chart for illustrating an entire operation process of the control code extraction apparatus of FIG. 5.

FIG. 5 is a block diagram for illustrating an entire structure of a control code extraction apparatus for extracting code controlling the copying and playing which are embedded in copyrighted digital audio contents according to an embodiment of the present invention, FIG. 6 is a block diagram for illustrating in detail a dispersion information collection part of FIG. 5 for collecting control code information dispersedly embedded, FIG. 7 is a block diagram for illustrating in detail a control code selection part of FIG. 5 for selecting only control code from information collected from the dispersion information collection part, and FIG. 8 is a flow chart for illustrating an entire operation process of the control code extraction apparatus of FIG. 5

A control code extraction apparatus 2 includes a dispersion information collection part 21 having a frequency conversion part 211 and a frequency scale conversion part 212; a control code selection part 22 having a moving average value calculation part 221, a threshold value calculation part 222, and a residual calculation part 223; and a decode/command signal generation part 23.

The dispersion information collection part 21 integrates control code information dispersed in time into one information, the control code selection part 22 selects only code information from information w extracted from the dispersion information collection part 21, and the decode/command signal generation part 23 decode the code information selected from the control code selection part 22 and generates proper command signals.

The dispersion information collection part 21 divides into N units and analyzes control code-embedded digital audio signal x* during extracting control code in order for the digital audio signal x* to be rapidly converted into a frequency domain. It is the reason that lots of data can not be processed at a time since a small memory is used in a portable device and that the N units suitable for high-speed algorithm applications are used for rapid calculations.

The signal x* is divided into N units to which the windowing is applied, and, at this time, a signal length is set to 2N for the sake of convenient analyses. The units of N less than 1024 result in enough calculation speed and storage space. The windowing reason is to cut off high frequencies to be generated at edges during converting a control code-embedded audio signal into a frequency domain in the frequency conversion part 211. The frequency conversion part 211 brings the same result in use of any of the Fast Fourier Transform (FFT), Discrete Cosine Transform(DCT), and Discrete Sine Transform(DSI), but the FFT is the most efficient with the smallest calculation amount and rapidity. The frequency conversion part 211 performs the windowing FFT as to control code-embedded audio signals, continuously sums so obtained signals, and explicitly reveals frequency bandwidths attenuated at the time when control code is embedded. The frequency conversion part 211 performs the FFT, converts audio signals into frequency signals, obtains an amplitude spectrum, and transfers to the frequency scale conversion part 212 signals Y converted into a frequency domain.

The frequency scale conversion part 212 is the most important part in extracting control code process. Information embedded in audio signals is hardly detected by a simple summation of signals converted into a frequency domain.

Figure 10:
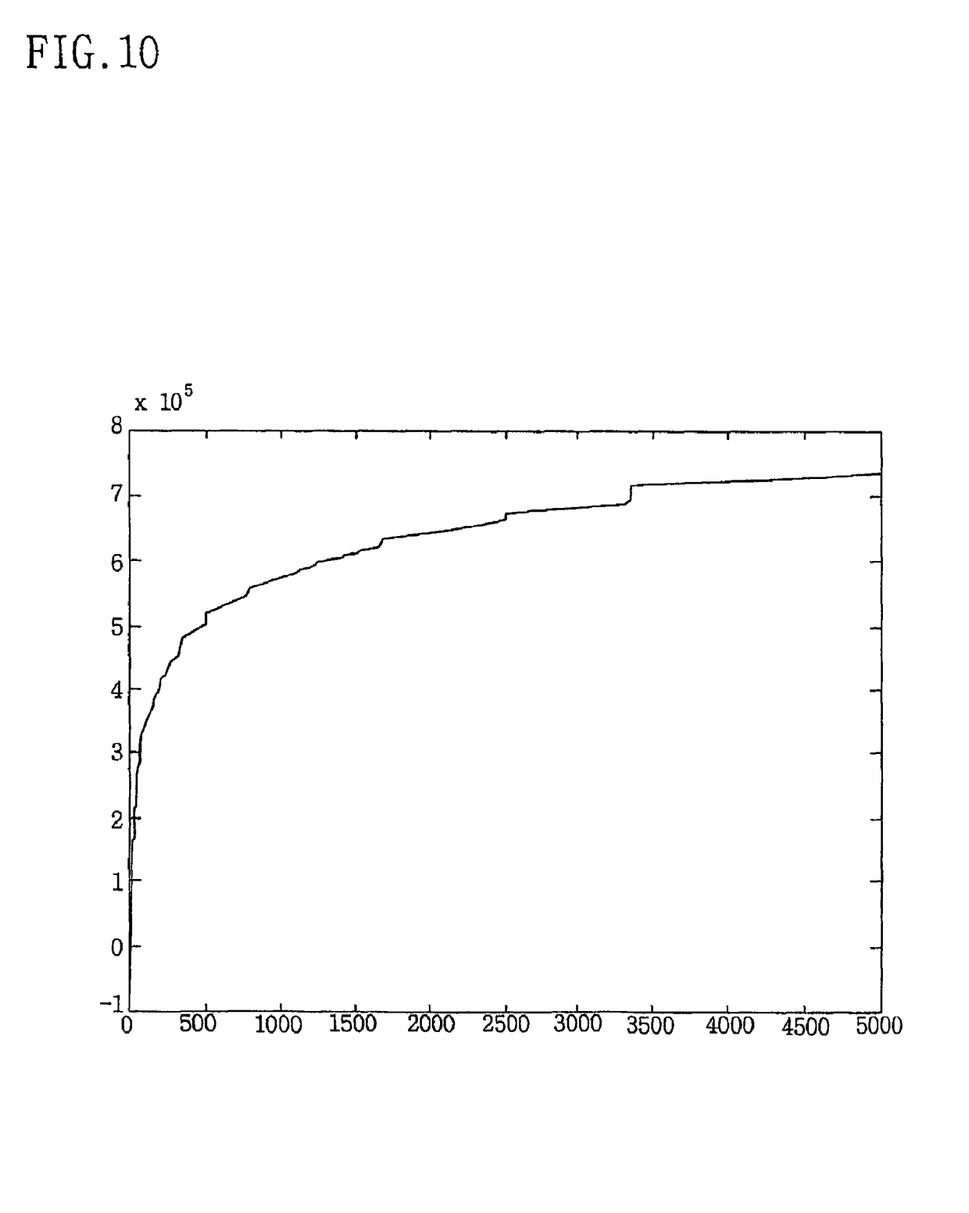
FIG. 10 is a view for showing a scaling curve applied in a frequency scale conversion part of FIG. 6.

Therefore, the frequency scale is changed to a logarithm scale to reduce information embedded in audio signals. Experiments show that the most suitable is the scale conversion in a logarithm form. However, the present invention uses a corrected logarithm function since a range of values audio frequency components have is limited different from the general logarithm scale. FIG. 10 shows a corrected logarithm scale, which is a corrected logarithm curve, converting into the same signal magnitudes as to values more than a certain value.

The frequency conversion part 211 and frequency scale conversion part 212 of the dispersion information collection part 21 described above divide the signal x* into N signals and repeat M times. At least 500 times repetitions must be done to surely select control code. That is, audio signals as much as 5 seconds to 10 seconds at least should be required to find the control code(S81).

A w added with M times repetitions in the dispersion information collection part 21 is sent to the control code selection part 22. First, the control code selection part 22, as a post-processing for extracting code information, calculates a moving average of the signals w through the moving average value calculation part 221. Since the magnitudes of audio signal components are not evenly generated but have relatively large values in low frequency components, only signals having smaller components than the average value based on the moving average value must be separately extracted.

The residual calculation part 223 produces residual components from the signals w and the moving average value, and the residual components are constituted with smaller components than the moving average value and all the residual components equal to or larger than the moving average value are set to 0.

The residual components produced from the residual calculation part 223 are components showing relatively robust responses out of audio components, and regions in which control code are embedded show the most robust signal responses out of the audio components. Accordingly, the components of values smaller than a threshold value set in the threshold value calculation part 222 become control code information(S82).

The threshold value is set to 0.5 in case that the residuals are generalized to values from 0 to 1 as the magnitudes of the audio components since the magnitudes of the residuals greatly vary according to the audio volume.

The decode/command signal generation part 23 decode commands of extracted control code and generates command signals, and, in order to look for control code values from the extracted residual components, measures positions where the residual components have smaller values than the threshold value and measures distances as to the positions.

Figure 9:
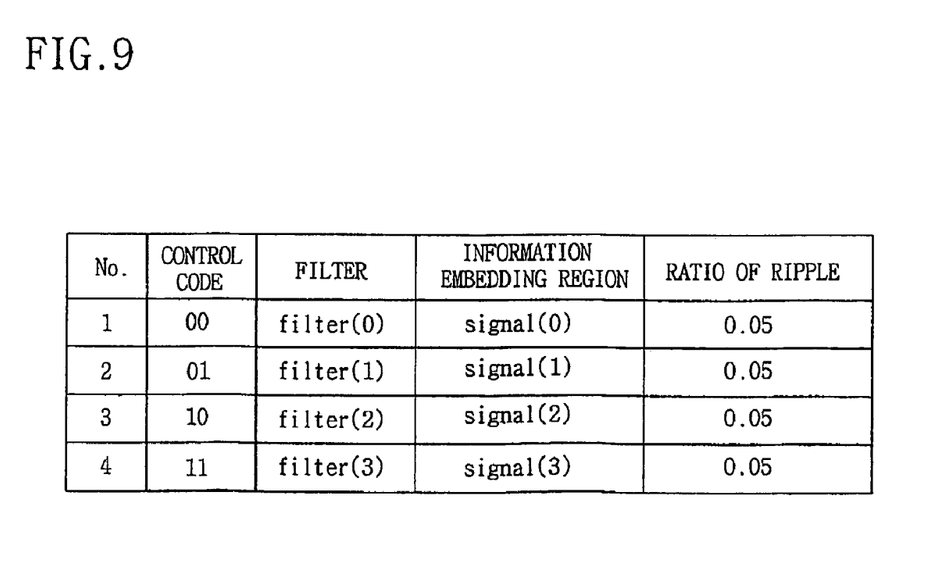
FIG. 9 is a code table listing exemplary watermark embedding filter according to control code.

A control code and a command corresponding to a distance between two positions are searched from the code table, exemplarily listed in FIG. 9, of filter according to control code. A command signal is produced in case that there exists a corresponding control code command through the search, and a signal is not produced in case that a corresponding code does not exist(S83).

Further, computer readable recording medium, which is recorded a program for controlling the copying and playing of copyrighted digital audio contents according to the present invention, launches said recorded control program, when audio file is played, as shown in the flow charts of FIG. 4 and FIG. 8.

Through the above process, an embedded control code is extracted in real time when copying or playing audio signals after having embedded the control code information of certain bits into digital audio through filtering, and, in case that the extracted control code indicates "no more copy", the copying is immediately stopped, so that illegal copying and playing of digital audio contents are controlled.

The computer-readable record medium recording a program for controlling the above copying and playing of copyrighted digital audio contents includes optical recording media(CD, CD-R, CD-RW), floppy disks, hard disks, and Zip disks. In addition to computer-readable record media recording a program immediately executable by a computer, included are record media recording such programs as executable by being once installed in other recording media (hard disks and so on), record media recording coded or compressed programs, ROMs, RAMs, and the like.

INDUSTRIAL APPLICABILITY

As described above, the apparatus and method for controlling the copying and playing of copyrighted digital audio contents according to the present invention are robust against very diverse audio signal process attacks and file conversions, so it can simultaneously carry out the watermarking technology in before-arising meaning as well as the copyright protection function in after-arising meaning. Further, the apparatus and method can be implemented in PCs and DSP chips due to a small calculation amount and a light program code size using an effective algorithm for embedding and extracting a series of control code as well as implemented in real time in MP3 players, PDAs, Mobile Phones, CD-writers, audio broadcast equipment, and so on.

The present invention, as applied to MP3 players, PDAs, Mobile Phones, and so on, enhances a copyright protection effect as to audio contents by preventing audio contents from illegal distributions, copies, and plays.

What is claimed is:

1. A control code embedding apparatus for embedding control code controlling copying and playing of copyrighted digital audio contents, comprising:
   a control code dispersion timing determination part for determining timing dispersedly embedding control code into digital audio signals;
   a control code embedding part for designing filter corresponding to the control code and embedding the control code into the digital audio signals through filtering in the designed filter at the timing determined in the control code dispersion timing determination part; and
   a digital audio signal summation part for summing control code-embedded digital audio signals and control code-free digital audio signals and generating the summed digital audio signals,
   wherein the control code embedding part includes;
   a control code conversion part for receiving control code information and selecting filter corresponding to the control code;
   a filter design part for designing a filter based on the information from the control code conversion part; and
   a filtering part for filtering the digital audio signals components by using filter coefficients outputted from the filter design part and for attenuating signals of particular frequency band, and
   wherein the control code dispersion timing determination part includes:
   an eigenvalue extraction part for extracting eigenvalues from the digital audio signals inputted; and
   a random number generation part for using as an initial solution the eigenvalues inputted from the eigenvalue extraction part and for generating random numbers determining timings at which the control code are embedded.

2. A control code extraction apparatus for extracting control code from copyrighted digital audio contents in which the control code are embedded in use of any embedding apparatus of claim 1, comprising:
   a dispersion information collection part for collecting control code information dispersedly embedded in digital audio signals inputted;

a control code selection part for selecting only the control code from the information collected in the dispersion information collection part; and a decode/command signal generation part for decoding control code commands selected from the control code selection part and for generating command signals.

3. The control code extraction apparatus as claimed in claim 2, wherein the dispersion information collection part includes:

a frequency conversion part for carrying out frequency conversions as to the summed digital audio signals and outputting an amplitude spectrum; and a frequency scale conversion part for converting the amplitude spectrum into a log scale and attenuating information embedded in the frequency-converted digital audio signals.

4. The control code extraction apparatus as claimed in claim 3, wherein the control code selection part includes:

a moving average value calculation part for receiving the frequency-converted audio signal received from the dispersion information collection part and calculating a moving average;

a threshold value calculation part for producing a threshold value distinguishing the digital audio signals and the control code signals based on the moving average values received from the moving average value calculation part; and a residual calculation part for producing residuals constituted with smaller values than the moving average value from the frequency-converted audio signals and the moving average value and for outputting control code-embedded position information from the residual components smaller than the threshold value.

5. A control code embedding method for embedding control code controlling copying and playing copyrighted digital audio contents, comprising steps of:

(a) determining timings dispersedly embedding control code into digital audio signals;

(b) designing filter corresponding to the control code and embedding the control code into the digital audio signals at embedment timing determined in step (a) through filtering of the designed filter, wherein designing includes:

receiving control code information and selecting a filter corresponding to the control code;

designing filter according to the selected filter information; and filtering the digital audio signals components and attenuating particular bandwidth frequency signals; and (c) summing control code-embedded digital audio signals and control code-free digital audio signals and generating the summed digital audio signals, wherein the step (a) includes steps of:

extracting eigenvalues from the digital audio signals inputted; and generating random numbers determining timings at which the control code are embedded in use of the eigenvalues as an initial solution.

6. A control code extraction method for extracting control code from control code-embedded digital audio signals in use of any embedding method of claim 5, comprising steps of:

(d) collecting the control code information dispersedly embedded in the digital audio signals inputted;

(e) selecting only the control code from the information collected in step (d); and (f) decoding the selected control code commands and generating command signals.

7. The control code extraction method as claimed in claim 6, wherein the step (d) includes steps of:

carrying out frequency conversions as to the summed digital audio signals and outputting an amplitude spectrum; and converting the amplitude spectrum into a logarithm scale and attenuating the information embedded in the frequency-converted digital audio signals.

8. The control code extraction method as claimed in claim 7, wherein the step (e) includes steps of:

calculating a moving average value of the frequency-converted audio signals;

producing a threshold value distinguishing the digital audio signal and the control code signal based on the moving average value; and producing residuals constituted with smaller values than the moving average value from the frequency-converted audio signals and the moving average value, and outputting control code-embedded position information from residual components smaller than the threshold value.

9. A control code embedding apparatus for embedding control code controlling copying and playing of copyrighted digital audio contents, comprising:

a control code dispersion timing determination part for determining timing dispersedly embedding control code into digital audio signals;

a control code embedding part for designing filter corresponding to the control code and embedding the control code into the digital audio signals through filtering in the designed filter at the timing determined in the control code dispersion timing determination part; and a digital audio signal summation part for summing control code-embedded digital audio signals and control code-free digital audio signals and generating the summed digital audio signals, a dispersion information collection part for collecting control code information dispersedly embedded in digital audio signals inputted;

a control code selection part for selecting only the control code from the information collected in the dispersion information collection part; and a decode/command signal generation part for decoding control code commands selected from the control code selection part and for generating command signals, wherein the control code embedding part includes;

a control code conversion part for receiving control code information and selecting filter corresponding to the control code;

a filter design part for designing a filter based on the information from the control code conversion part; and a filtering part for filtering the digital audio signals components by using filter coefficients outputted from the filter design part and for attenuating signals of particular frequency band, wherein the dispersion information collection part includes:

a frequency conversion part for carrying out frequency conversions as to the summed digital audio signals and outputting an amplitude spectrum; and a frequency scale conversion part for converting the amplitude spectrum into a log scale and attenuating information embedded in the frequency-converted digital audio signals, and wherein the control code selection part includes:
- a moving average value calculation part for receiving the frequency-converted audio signal received from the dispersion information collection part and calculating a moving average;
- a threshold value calculation part for producing a threshold value distinguishing the digital audio signals and the control code signals based on the moving average values received from the moving average value calculation part; and
- a residual calculation part for producing residuals constituted with smaller values than the moving average value from the frequency-converted audio signals and the moving average value and for outputting control code-embedded position information from the residual components smaller than the threshold value.

10. A control code embedding method for embedding control code controlling copying and playing copyrighted digital audio contents, comprising steps of:
- (a) determining timings dispersedly embedding control code into digital audio signals;
- (b) designing filter corresponding to the control code and embedding the control code into the digital audio signals at embedment timing determined in step (a) through filtering of the designed filter, wherein designing includes:
  - receiving control code information and selecting a filter corresponding to the control code;
  - designing filter according to the selected filter information; and
  - filtering the digital audio signals components and attenuating particular bandwidth frequency signals;
- (c) summing control code-embedded digital audio signals and control code-free digital audio signals and generating the summed digital audio signals,
- (d) collecting the control code information dispersedly embedded in the digital audio signals inputted;
- (e) selecting only the control code from the information collected in step (d); and
- (f) decoding the selected control code commands and generating command signals wherein the step (d) includes steps of:
- carrying out frequency conversions as to the summed digital audio signals and outputting an amplitude spectrum; and
- converting the amplitude spectrum into a logarithm scale and attenuating the information embedded in the frequency-converted digital audio signals, and wherein the step (e) includes steps of:
- calculating a moving average value of the frequency-converted audio signals;
- producing a threshold value distinguishing the digital audio signal and the control code signal based on the moving average value; and
- producing residuals constituted with smaller values than the moving average value from the frequency-converted audio signals and the moving average value, and outputting control code-embedded position information from residual components smaller than the threshold value.

* * * * *